United States Patent
Kwatra et al.

(10) Patent No.: US 11,932,285 B2
(45) Date of Patent: Mar. 19, 2024

(54) COMMUNICATION PRIORITIZATION IN VEHICLES WITH AUTOMATED DRIVER ASSISTANCE

(71) Applicant: INTERNATIONAL BUSINESS MACHINES CORPORATION, Armonk, NY (US)

(72) Inventors: Shikhar Kwatra, San Jose, CA (US); Sushain Pandit, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 17/092,484

(22) Filed: Nov. 9, 2020

(65) Prior Publication Data
US 2022/0144312 A1 May 12, 2022

(51) Int. Cl.
| | |
|---|---|
| *B60W 60/00* | (2020.01) |
| *G06N 20/00* | (2019.01) |
| *G06V 40/16* | (2022.01) |
| *G06V 40/20* | (2022.01) |
| *H04N 7/18* | (2006.01) |

(Continued)

(52) U.S. Cl.
CPC ......... *B60W 60/0059* (2020.02); *G06N 20/00* (2019.01); *G06V 40/174* (2022.01); *G06V 40/20* (2022.01); *H04N 7/183* (2013.01); *H04W 4/40* (2018.02); *H04W 72/56* (2023.01); *B60W 2540/00* (2013.01); *B60W 2556/45* (2020.02)

(58) Field of Classification Search
CPC ......... B60W 60/0059; B60W 2540/00; B60W 2556/45; G06N 20/00; G06N 3/08; G06N 20/10; G06V 40/174; G06V 40/20; G06V 20/597; H04N 7/183; H04W 4/40; H04W 72/56; H04W 4/16
USPC ......................................... 701/23
See application file for complete search history.

(56) References Cited

U.S. PATENT DOCUMENTS 9,834,224 B2 * 12/2017 Gordon ............. B60W 60/0051
9,981,669 B2 *  5/2018 Gordon ............. B60W 60/0051
(Continued)

FOREIGN PATENT DOCUMENTS

EP 2925027 * 3/2015

OTHER PUBLICATIONS

Song, et al., "Detecting Driver Phone Calls in a Moving Vehicle Based on Voice Features," IEEE INFOCOM 2016—The 35th Annual IEEE International Conference on Computer Communications, San Francisco, CA, Apr. 2016, pp. 1-9 [online] [retrieved on May 13, 2020] Retrieved from the Internet: <https://ieeexplore.ieee.org/document/7524437> <doi: 10.1109/INFOCOM.2016.752443>.

*Primary Examiner* — Muhammad Shafi
(74) *Attorney, Agent, or Firm* — David Spalding

(57) ABSTRACT

Communications are managed and prioritized by a machine learning process in a vehicle with automated driver assistance. It is detected that the vehicle is currently being operated in manual mode by a human driver. It is detected that a telecommunication device located within the vehicle is receiving a communication. The communication is classified according to a priority. The communication is acted upon based on the priority classification. The driver state is assessed at the conclusion of the communication. The vehicle returns to the manual driving mode if the driver state is compatible with the manual driving mode.

12 Claims, 6 Drawing Sheets

(51) Int. Cl.
  *H04W 4/40* (2018.01)
  *H04W 72/56* (2023.01)

(56) References Cited

U.S. PATENT DOCUMENTS

| | | |
|---|---|---|
| 10,362,068 B2 | 7/2019 | Sugioka |
| 2015/0160019 A1* | 6/2015 | Biswal .................. G06Q 50/01 |
| | | 701/1 |
| 2017/0106876 A1* | 4/2017 | Gordon ............ B60W 60/0051 |
| 2018/0057016 A1* | 3/2018 | Gordon ................ G05D 1/0061 |
| 2018/0290660 A1 | 10/2018 | Huang |
| 2019/0056731 A1 | 2/2019 | Westbrook |
| 2019/0276048 A1 | 9/2019 | Suzuki |

\* cited by examiner

COMMUNICATION PRIORITIZATION IN VEHICLES WITH AUTOMATED DRIVER ASSISTANCE

FIELD

The present disclosure relates to the field of vehicles, and specifically to the field of vehicles with automated driver assistance. Still more specifically, the present disclosure relates to the field of controlling whether vehicles with automated driver assistance operate in automated mode or manual mode based on the priority classification of an incoming communication and whether or not the call can be routed to a passenger in the vehicle.

BACKGROUND

Motor vehicles are steadily becoming more automated in order to reduce distractions while driving and to provide other safety features. Vehicles equipped with various automated driver assistance features are able to drive themselves in varying degrees through private and/or public spaces while being monitored by a human driver. Using a system of sensors that detect the location and/or surroundings of the vehicle, logic within or associated with the vehicle may control the speed, propulsion, braking, and steering of the vehicle based on the sensor-detected location and surroundings of the vehicle.

SUMMARY

Embodiments of the present invention disclose a computer-implemented method for managing communication prioritization in a vehicle with automated driver assistance. The method includes detecting that the vehicle is currently being operated in manual mode by a human driver. The method also includes detecting that a telecommunication device located within the vehicle is receiving a communication. In addition, the method includes classifying the communication according to a priority and acting on the communication based on the priority classification. Further, the method includes assessing a driver state at the conclusion of the communication and returning to the manual driving mode if the driver state is compatible with the manual driving mode.

In accordance with other embodiments, a computer program product is provided for managing communication prioritization in a vehicle. The computer program product comprises a computer readable storage device storing computer readable program code embodied therewith, the computer readable program code comprising program code executable by a computer to perform a method. The method comprises detecting that the vehicle is currently being operated in manual mode by a human driver and that a telecommunication device located within the vehicle is receiving a communication. The method also includes classifying the communication according to a priority and acting on the communication based on the priority classification. Further, the method comprises assessing a driver state at the conclusion of the communication and returning to the manual driving mode if the driver state is compatible with the manual driving mode.

In accordance with yet other embodiments, a computer system is provided for managing communication prioritization in a vehicle. The computer system comprises one or more processors, one or more computer-readable memories, one or more computer-readable tangible storage media, and program instructions stored on at least one of the one or more tangible storage media for execution by at least one of the one or more processors via at least one of the one or more memories. The computer system is capable of performing a method for managing communication prioritization in a vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
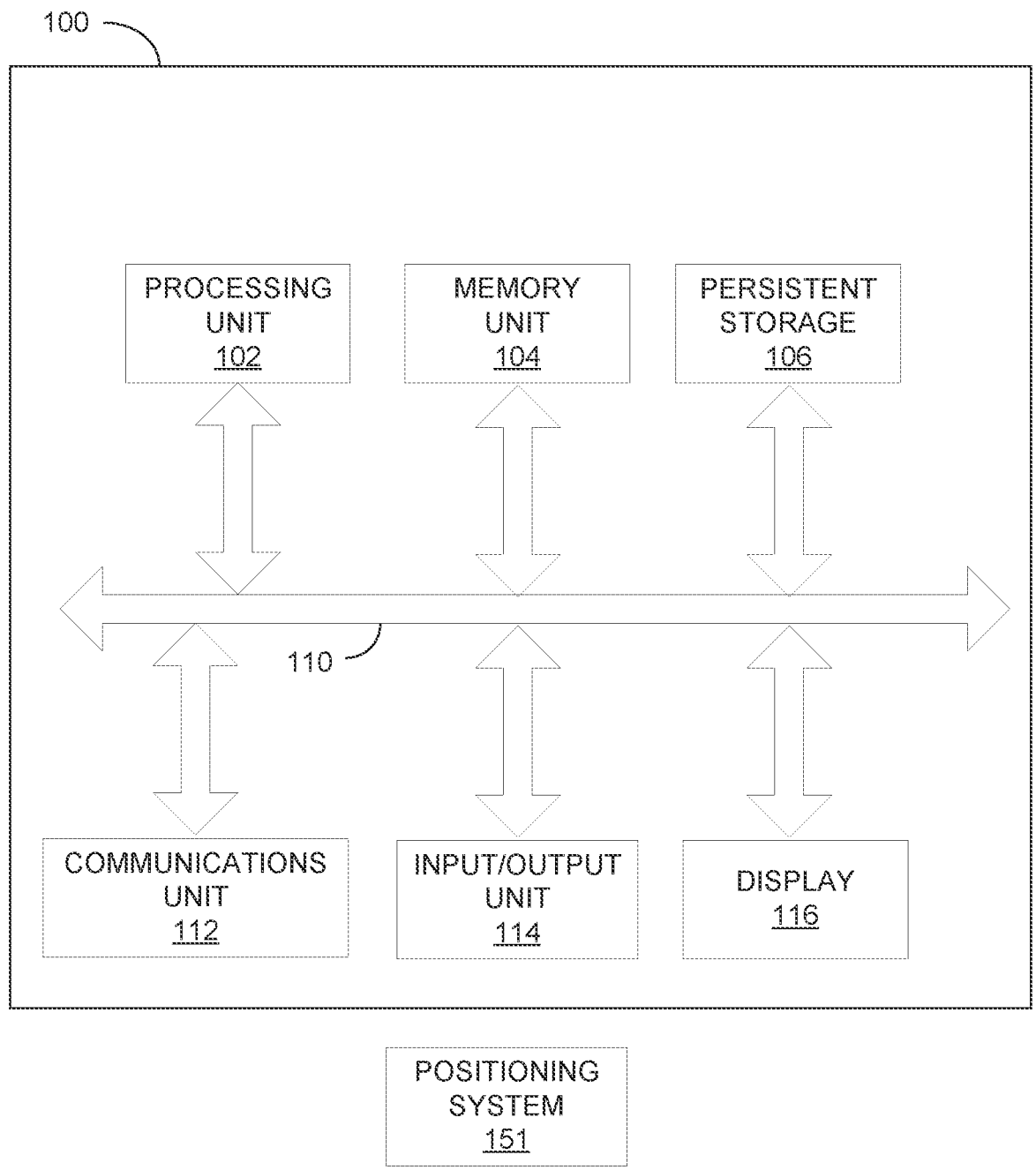
FIG. 1a is a block diagram of an example computer system including persistent storage which may be implemented according to an embodiment.

Although vehicles with automated driver assistance features may not need any manual control and may be able to drive automatically taking the surrounding situational context (e.g., road condition, nearby vehicles, speed, etc.) into consideration, drivers often tend to override autonomous control due to several factors, viz., inclination to driving when conditions are ideal (e.g., driving when there is no traffic jam, beautiful scenery, smooth road etc.). A driver may also intervene and override autonomous control when, in the driver's judgement, the vehicle's computer is controlling the vehicle in an unsafe manner (e.g., not stopping for another vehicle stopped in front of the vehicle using automated driving assistance.) As per most traffic regulations today, texting/calling while driving is prohibited under law, however, in the scenario where the driver is driving a vehicle that is capable of autonomous control and receives a phone call, text message or other similar communication on the driver's personal communication device, e.g., smart phone, there is room and necessity for a method and system by which a vehicle with automated driver assistance will take control and allow the driver to receive the phone call.

As used and described herein, "manual mode" is defined as a vehicle with automated driver assistance being at least partially under the input control of a human driver. As used and described herein, "automated mode" is defined as the vehicle with automated driver assistance being totally controlled by hardware/software logic without input required from the human driver (unless the driver desires to intervene). That is, if a vehicle with automated driver assistance is being steered by a human driver but has cruise control activated, then it is in manual mode, since the vehicle with automated driver assistance is partially under the input control (steering) of the human driver. However, if steering, braking, throttle control, obstacle/vehicle avoidance, etc. are all under the control of hardware/software logic, then the vehicle with automated driver assistance is in automated mode. As used and described herein, "vehicle" means a motor vehicle with automated driver assistance features capable of operating the vehicle in automated mode.

According to an embodiment, a vehicle may be connected to a driver's mobile or wearable devices, e.g. smart phone or smart wristwatch, to monitor incoming communications such as phone calls or texts. If a communication is received, then the system may use a machine learning classifier to determine a priority of the communication and predict if the driver wishes to answer the communication. Once the priority of the communication is determined, the system may alert the vehicle about the priority of the incoming communication and require the driver's response. The vehicle may ask the driver to attend to the communication and automatically transition from manual driving mode to automated mode. In addition, the system may determine that a call can be routed to a passenger or ignored. If the driver has answered the call and the vehicle has transitioned to automated mode, the vehicle may assess the driver state when the call is in progress or complete to determine whether to return to manual driving mode.

The system may seek feedback from the driver at an appropriate time in the form of explicit preferences (e.g., the driver indicates specific contacts as high priority) to improve the machine learning model and train the classifier on the priority of communications (e.g. high, medium or low) over time and restrict alerts to only those that are high priority. The system may also prepare a training data set by observing driver behavior using various permutations of a feature vector comprising communication metadata variables such as received_from, time_of_day, length_of_msg, call_duration, topic, urgency, etc. Once the training set is reasonably large, the system trains a machine learning model to learn how to classify a new incoming communication. Whenever a new communication is received, it may first be parsed into constituents/metadata to derive the values for the feature vector, which would then be fed through the classification model to determine priority. This classification is used to enhance the call routing prediction.

The system may also seek feedback to determine whether communications at a certain priority can be addressed by passengers (if present and part of the driver's established personal profile) and if so, the system does not need to take control away from the driver because the communication can be handled by someone other than the driver. For instance, a driver may have established a trust profile ("inner circle") in their profile that lists individuals in close personal, social or professional proximity to the driver who may be able to take communications on particular topics on the driver's behalf when present in the vehicle. As part of establishing this profile, the system may determine presence in the vehicle of a spouse or other person on the inner circle list via their mobile device fingerprint. According to an embodiment, a passenger may be validated through an application on the passenger's smart phone, which provides a device identifier, or "fingerprint", to the on-board computer of the vehicle with automated driver assistance. If the driver then receives an incoming communication while driving with a passenger, the system may be able to determine physical and relationship proximity of the passenger relative to the driver using the inner circle list and the validated passenger device. The call/message may be redirected to a passenger who has a personal, social or professionally proximate relationship with the driver that is above a threshold instead of switching the vehicle to automated mode and routing the incoming communication to the driver. If the driver chooses to personally answer or reply to the communication, then the system could learn and may prompt the user to adjust their profile. In various embodiments, a driver may assign a social 'proximity score' (1-3) to individuals on their inner circle list within their profile. Based on this score, the system may perform further selective routing (e.g., passengers with score closer to 3, always suggest routing; whereas for passengers with scores closer to 1, only suggest intermittently).

Referring now to FIG. 1a, there is shown a block diagram illustrating a computer system and a positioning system 151 which may be embedded in a vehicle with automated driver assistance according to an embodiment. A smart phone, e.g., smart phone 504, may include an instance of computer system 100 and positioning system 151. As shown, a computer system 100 includes a processor unit 102, a memory unit 104, a persistent storage 106, a communications unit 112, an input/output unit 114, a display 116, and a system bus 110. Computer programs are typically stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor 102 gives to memory 104 along with a request to read and/or write. Usually, the reading and interpretation of an encoded instruction at an address causes the processor 102 to fetch a subsequent instruction, either at a subsequent address or some other address. The processor unit 102, memory unit 104, persistent storage 106, communications unit 112, input/output unit 114, and display 116 interface with each other through the system bus 110.

Figure 1B:
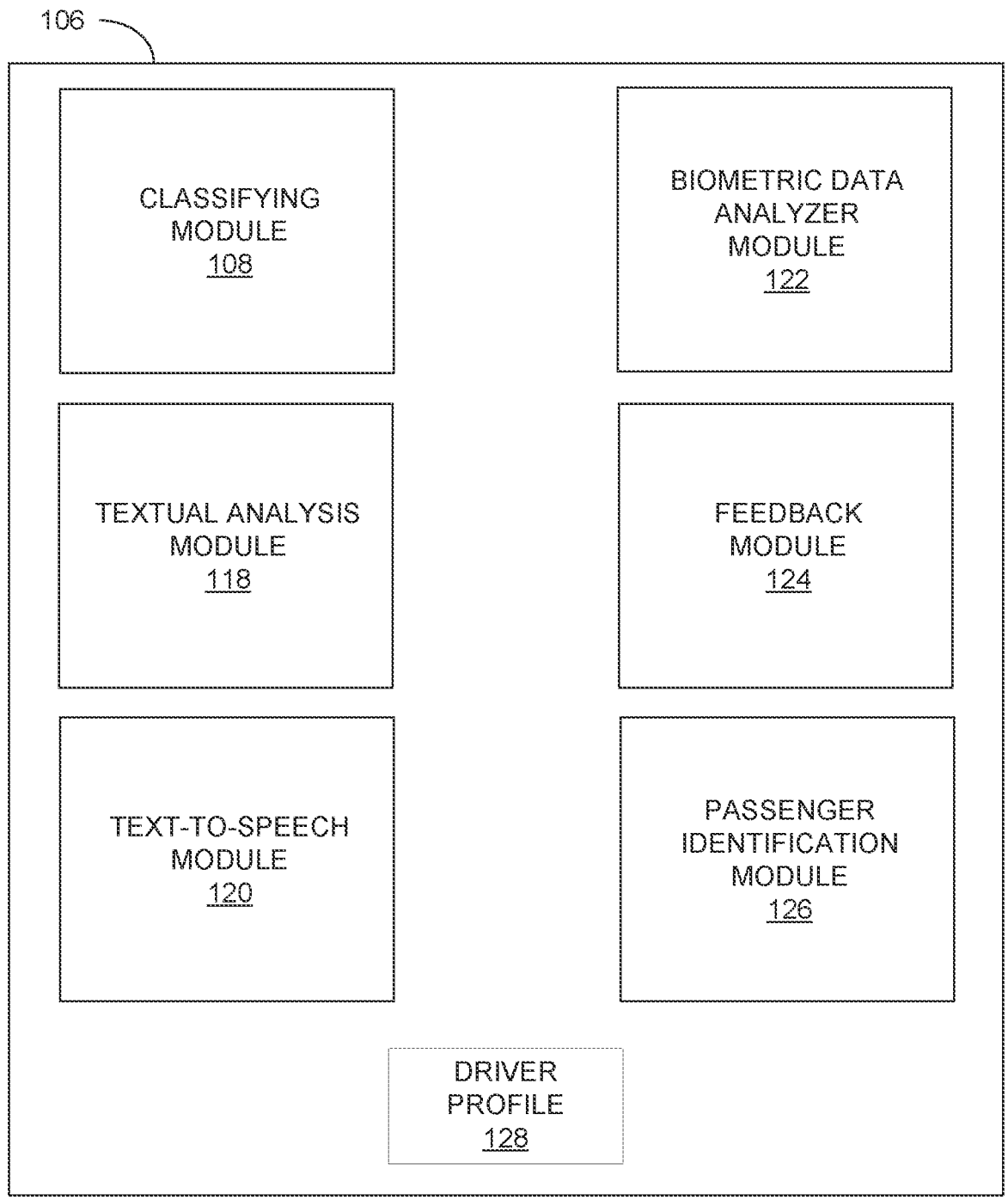
FIG. 1b is a block diagram showing the detailed modules of an example system within the persistent storage which may be implemented according to an embodiment.

FIG. 1b is a block diagram of the persistent storage 106. The persistent storage 106 may store a classifying module 108, a textual analysis module 118, a text-to-speech module 120, a biometric data analyzer module 122, a feedback module 124, a passenger identification module 126, and a driver profile 128. It should be appreciated that there may be an instance of the persistent storage 106 in a computer on board a vehicle with automated driver assistance, in a driver's smart phone, and in a passenger's smart phone. In various embodiments, all of the modules and data structures shown in the persistent storage 106 depicted in FIG. 1b may not be included in each instance of persistent storage 106, but rather particular modules and data structures may be disposed in only one of the instances. For example, a feedback module 124 may only be included in the computer system of a vehicle with automated driver assistance. As another example, a passenger identification module 126 may be included in both the computer system of a vehicle with automated driver assistance and the computer system of a passenger's smart phone.

Figure 2:
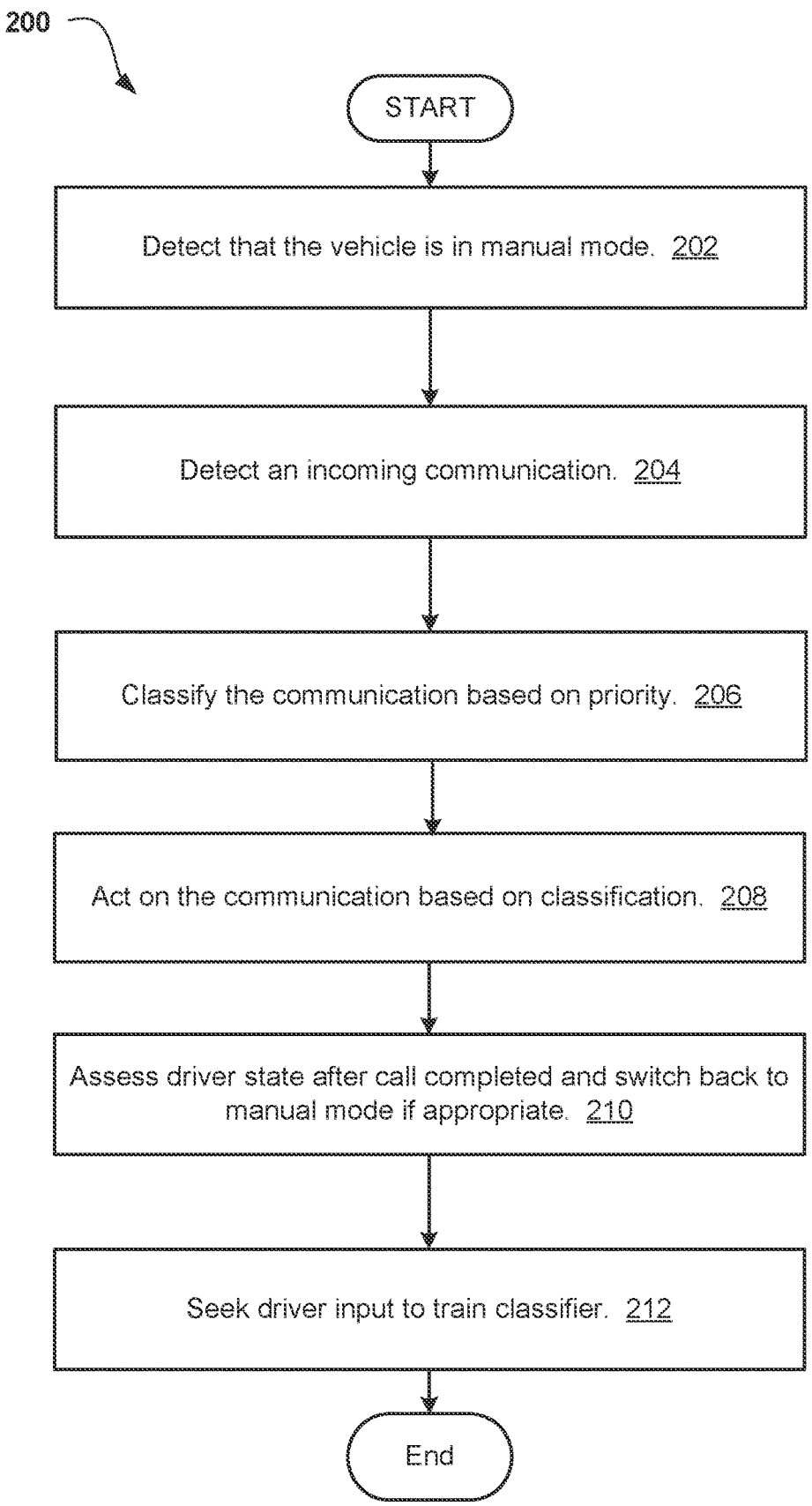
FIG. 2 is a flow chart of a communication classification and control process for a vehicle with automated driver assistance in accordance with one or more embodiments.

Referring to FIG. 2, a flow chart of a communication classification and control process 200 for vehicle with automated driver assistance is depicted. In various embodiments, some or all of the operations of this process may be performed by the on-board computer 401 of the vehicle. In other embodiments, some or all of the operations of this process may be performed by a smart phone or smart wristwatch of a driver or passenger.

At 202, the on-board computer 401 of the vehicle with automated driver assistance 400 (detailed in FIG. 4) may detect that the vehicle is in manual mode. At 204, the on-board computer 401 of the vehicle may receive a notification from the telecommunications device 425 that an incoming communication notification is received. Operation 204 analyzes the text of a text message or email communication. This may include parsing the text into constituent parts and determining topics or subjects of the message. At 204, it may be determined whether the incoming message includes a question or provides information. The textual analysis may determine whether a question in a message requests a response in a particular time period (e.g., urgent) or the provided information is time sensitive. The identity of the sender of a message in text form or the identity of a caller in the case of an incoming call may be determined. The various information determined in operation 204 may be stored as metadata values in a feature vector.

At 206, the classifying module 108 may use machine learning to determine the priority of the incoming communication based on the feature vector. The machine learning process may be a supervised machine learning classifier. Based on an input feature vector, and a training data set, the process at 206 may classify an incoming communication notification according to priority. In one embodiment, an incoming communication may be classified as high, medium, or low priority. Any suitable machine learning algorithm may be employed. For example, in various embodiments, the machine learning process may include one or more of a support vector machine, linear regression or a neural network. where typically the following steps are involved: 1) Feature selection: System prepares a training set by referring historical driver data and/or observing driver behavior in various different settings and permutations of features like {call_received_from, time_of_day, length_of_msg_received, call_duration}. These features are identified by parsing the metadata of a new call/message into constituents. 2) Model training and execution: Once the training set above is reasonably large (e.g, 500 samples), the system trains a machine learning model to learn how to classify a new/incoming call/message into expected driver behavior. Whenever a new call/message is received, it is first parsed into constituents/metadata to derive the values for the feature vector. The vector is then fed thru the classification model to determine expected prioritization class (high, med, low).

At 208, the system may act on the incoming communication based on the determined priority and following the process outlined in FIG. 3 below. Operation 208 may result in the vehicle being placed in automated driving mode so that an incoming phone call can be received by a driver. At 210, if a call is received, once the communication is completed, the system may assess the driver's current emotional state and return the vehicle to manual mode if it is determined to be appropriate. Assessment of the driver's emotional state may be based on biometric or physiological data collected during and after the call. For example, the driver's heart rate or pulse may be sensed and communicated to the on-board computer 401 using smart wristwatch the driver is wearing. Other examples of biometric or physiological parameters that may be sensed include skin temperature and skin conductance. An increase in a sensed biometric or physiological parameter over the time period of a call may be used to infer an emotional state, e.g., sweating and a rapid heart rate may indicate anxiety. In various embodiments, assessment of the driver's emotional state may be based on images of the user captured by a camera within the vehicle. Image processing algorithms for determining an emotion from a facial expression may be used to analyze the captured image. Post communication emotional states could be identified as {sad, happy, angry, excited, surprised, disgusted, . . . }.

At 212, the system may seek feedback from the driver once it is determined to be a safe environment to do so in order to further train the model. Feedback may be explicit or implicit. For example, a driver may provide an instruction or a rule that a call or textual message from a particular person should be classified as high, medium, or low priority. Similarly, an explicit classification priority may also be provided by the driver for a particular topic or subject. As an example of feedback that may be inferred, a driver may be asked to take an incoming phone call from a particular caller under a particular driving condition and the driver declines to take the call. An indication of low priority may be associated with the particular caller and the particular driving condition. If the driver is asked to take an incoming phone call from the same caller under a different driving condition and the driver accepts the call, an indication of medium priority may be associated with the caller and the different driving condition. For passenger call routing, the system may refer to the driver preference to determine whether a certain priority class can be addressed by the passenger. Assuming such a preference is set, then in the future, the calls at that level of priority could be routed to the passenger instead of the driver.

Figure 3:
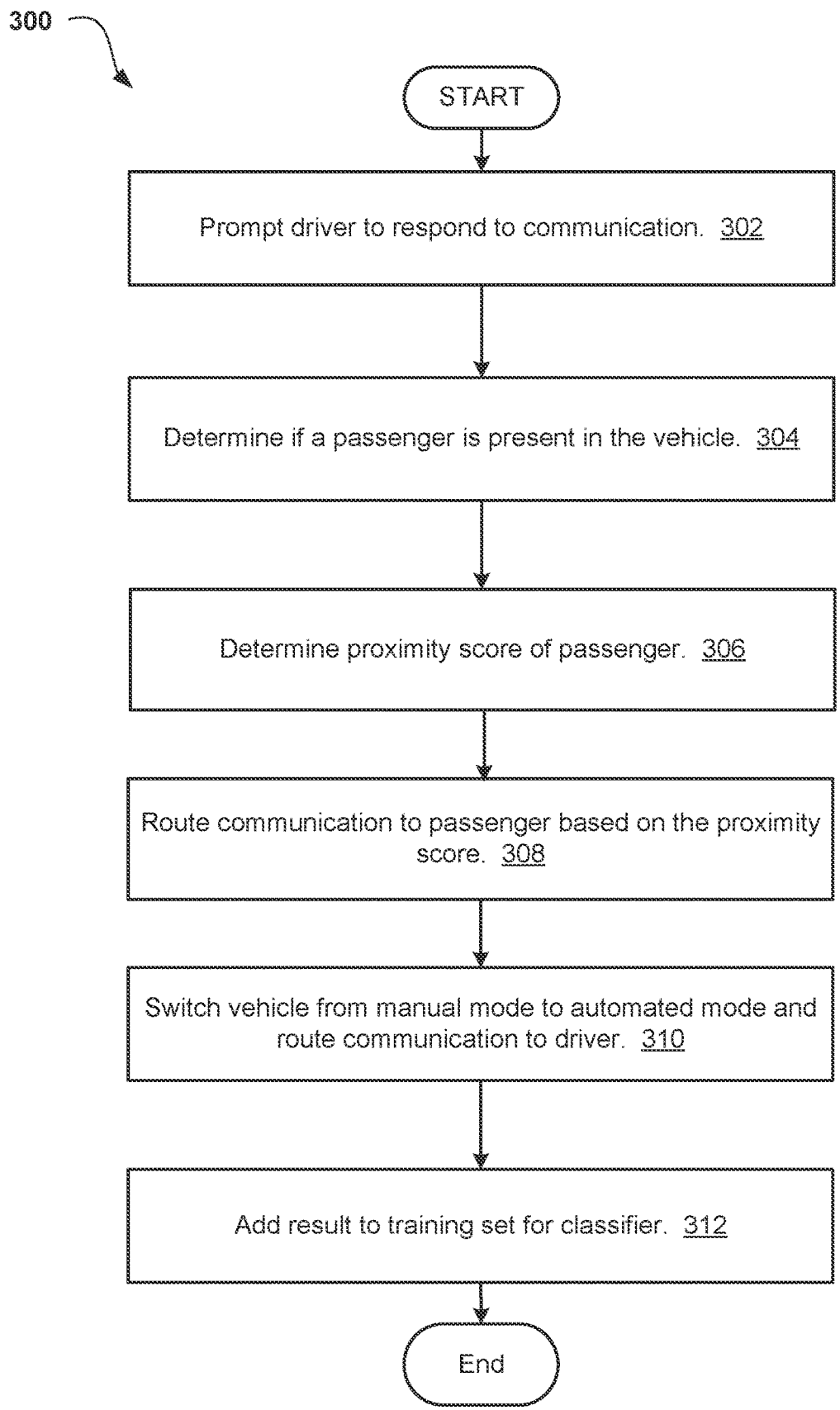
FIG. 3 is a flow chart of a process controlling a vehicle with automated driver assistance and routing an incoming communication based on priority classification of the communication in accordance with one or more embodiments.

Referring to FIG. 3, a flow chart of a process for controlling a vehicle with automated driver assistance and routing an incoming communication based on its priority classification 300, according to various embodiments, is shown. In various embodiments, some or all of the operations of this process may be performed by the on-board computer 401 of the vehicle. In other embodiments, some or all of the operations of this process may be performed by a smart phone or smart wristwatch of a driver or passenger.

At 302, the system may prompt the driver that the telecommunications device 425 has received an incoming communication. If a machine learning classifier has insufficient training data and lacks an explicit rule provided by a driver to classify an incoming communication with a sufficient degree of confidence, the driver may be asked whether the driver desires to take an incoming phone call or receive a textual message from a particular caller. (In the case of a text or email message, a text-to-speech process would preferably convert the text to synthetic speech.) When a machine learning classifier has sufficient training data or has an explicit classification rule to classify an incoming communication with a sufficient degree of confidence, operation 302 includes classifying the incoming communication prior to prompting the driver. The driver may be prompted to receive the communication only when the result of the classification is that the incoming message is of sufficient importance. For example, the driver may be prompted to receive only those incoming messages classified as being of high importance. As another example, the driver may be prompted to receive only those incoming messages classified as being of high or medium importance.

At 304, the system may determine if a passenger is present in the vehicle. In various embodiments, it may be determined that a passenger is present in the vehicle by detecting a device identifier or fingerprint of the passenger's smart phone.

At 306, the system may determine the identity of the passenger and calculate a proximity score based on its own model or else through feedback from the driver. The driver may establish a personal profile. The personal profile may list individuals in close personal, social, or professional proximity, i.e., in close "relationship" proximity, to the driver who may be able to take communications on particular topics on the driver's behalf when present in the vehicle. In one embodiment, the proximity score may be 1, 2, or 3, where a lower score indicates closer proximity. A spouse or a business partner may be scored as a 1 while a relatively new acquaintance may be scored a 3 and an employee scored a 2. The list in the personal profile may provide for two or more proximity scores for an individual, each for a different topic. For example, a business partner may be scored as a 1 if the topic of an incoming message is determined to relate to a business matter, but then scored as a 3 if the topic of an incoming message is determined to relate to a family matter.

At 308, the system may route the communication to the passenger based on the calculated proximity score. In some embodiments, the routing of the communication to the passenger may be additionally based on topic or subject of the communication. In still other embodiments, the routing of the communication to the passenger may be additionally based on a determined urgency or time sensitive nature of the communication. At 310, if the communication cannot be routed to a passenger, the system may switch the vehicle from manual to automated mode and route the communication determined to be important to the driver. At 312, the system will gather the results of the call (e.g. the passenger information, including proximity score and whether a passenger or the driver responded to the communication) and add the information to the training set for the machine learning model.

Figure 4:
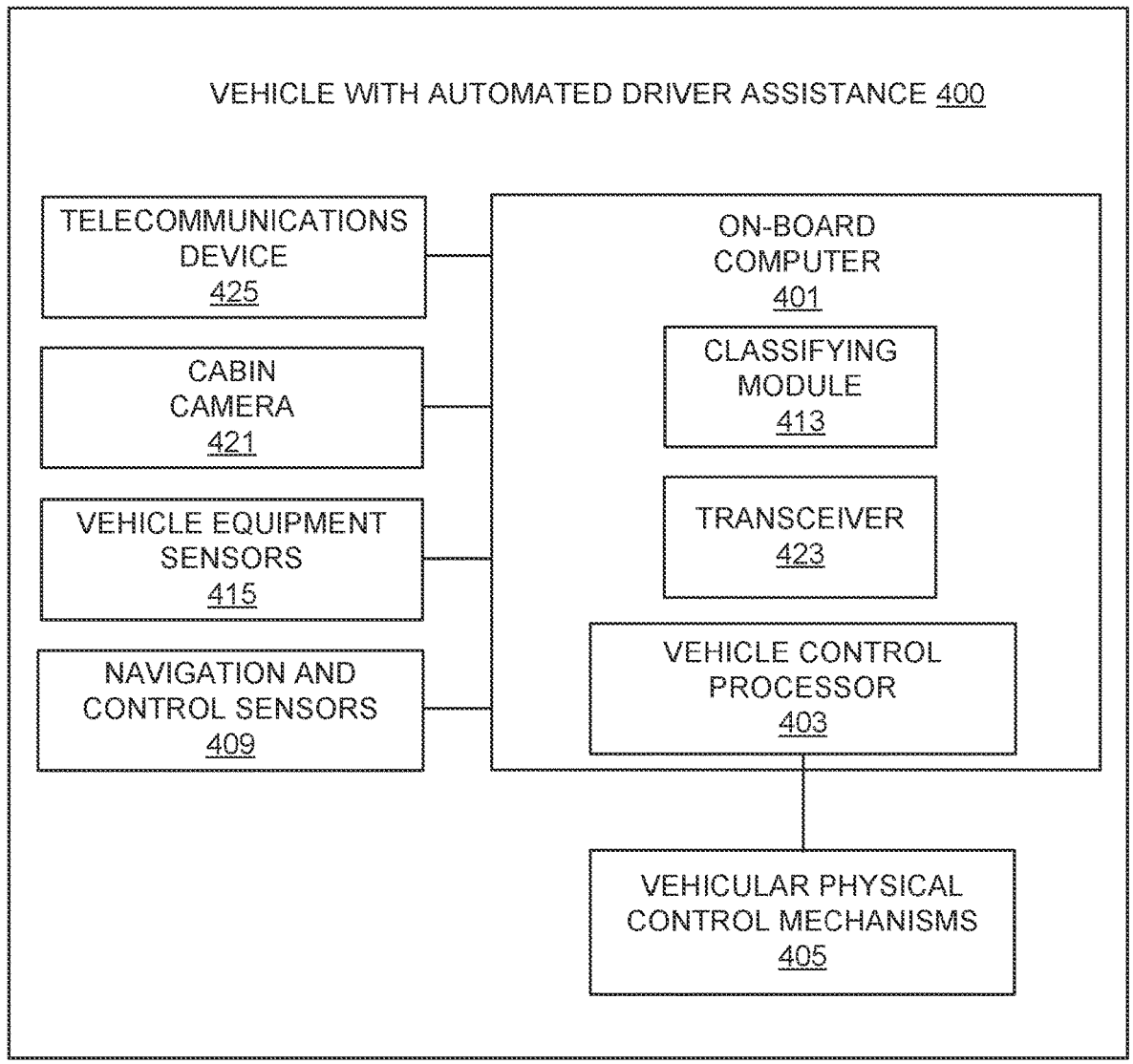
FIG. 4 shows additional detail of control hardware within one example of a vehicle with automated driver assistance features.

Referring now to FIG. 4, additional details of one or more embodiments of a vehicle with automated driver assistance are shown. Vehicle 400 has an on-board computer 401 that controls operations of the vehicle 400. The vehicle 400 can be selectively operated in manual mode or automated mode. While in manual mode, vehicle 400 operates as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to a vehicle control processor 403 by the driver result in output signals that control the vehicle's vehicular physical control mechanisms 405 (e.g., the engine throttle, steering mechanisms, braking systems, turn signals, etc.).

While in automated mode, the vehicle 400 operates without the input of a human driver, such that the engine, steering mechanism, braking system, horn, signals, etc. are controlled by the vehicle control processor 403, but now under the control of the on-board computer 401 of the vehicle 400. That is, by processing inputs taken from navigation and control sensors 409 and the classifying module 413 indicating that the vehicle 400 is to be controlled by the automation, then driver inputs are no longer needed (though the driver may override automated mode at any time).

As just mentioned, the on-board computer 401 uses outputs from navigation and control sensors 409 to control the vehicle 400. Navigation and control sensors 409 include hardware sensors that 1) determine the location of the vehicle 400; 2) sense other cars and/or obstacles and/or physical structures around the vehicle 400; 3) measure the speed and direction of the vehicle 400; and 4) provide any other inputs needed to safely control the movements of the vehicle 400.

With respect to the feature of 1) determining the location of the vehicle 400, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the vehicle 400. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around the vehicle 400, the positioning system 151 may use radar or other electromagnetic energy that is emitted from an electromagnetic radiation transmitter (e.g., transceiver 423 shown in FIG. 3), bounced off a physical structure (e.g., another car), and then received by an electromagnetic radiation receiver (e.g., transceiver 423). By measuring the time it takes to receive back the emitted electromagnetic radiation, and/or evaluating a Doppler shift (i.e., a change in frequency to the electromagnetic radiation that is caused by the relative movement of the vehicle 400 to objects being interrogated by the electromagnetic radiation) in the received electromagnetic radiation from when it was transmitted, the presence and location of other physical objects can be ascertained by the on-board computer 401 of the vehicle 400.

With respect to the feature of 3) measuring the speed and direction of the vehicle 400, this can be accomplished by taking readings from an on-board speedometer (not depicted) on the vehicle 400 and/or detecting movements to the steering mechanism (also not depicted) on the vehicle 400 and/or the positioning system 151 discussed above.

With respect to the feature of 4) providing any other inputs needed to safely control the movement of the vehicle 400, such inputs include, but are not limited to, control signals to activate a horn, turning indicators, flashing emergency lights, etc. on the vehicle 400.

In one or more embodiments of the present invention, also within the vehicle 400 is a cabin camera 421, which is able to capture still or moving images of persons within the cabin of the vehicle 400.

In one or more embodiments of the present invention, also within the vehicle 400 is a telecommunication device 425 (e.g., a smart phone, a cell phone, a laptop computer, etc.), which may be connected (e.g., via a near field communication—NFC connection) to the on-board computer 401 of the vehicle 400. In one embodiment of the present invention, if a high-priority communication is received or the driver wishes to initiate communication, one or more processors (e.g., within the on-board computer 401 of the vehicle 400) detect that a telecommunication device (e.g., telecommunication device 425) within the vehicle 400 is receiving a telecommunication message and control is automatically transferred to the on-board computer 401 of the vehicle 400, thus placing the vehicle 400, in some embodiments, in automated mode.

Figure 5:
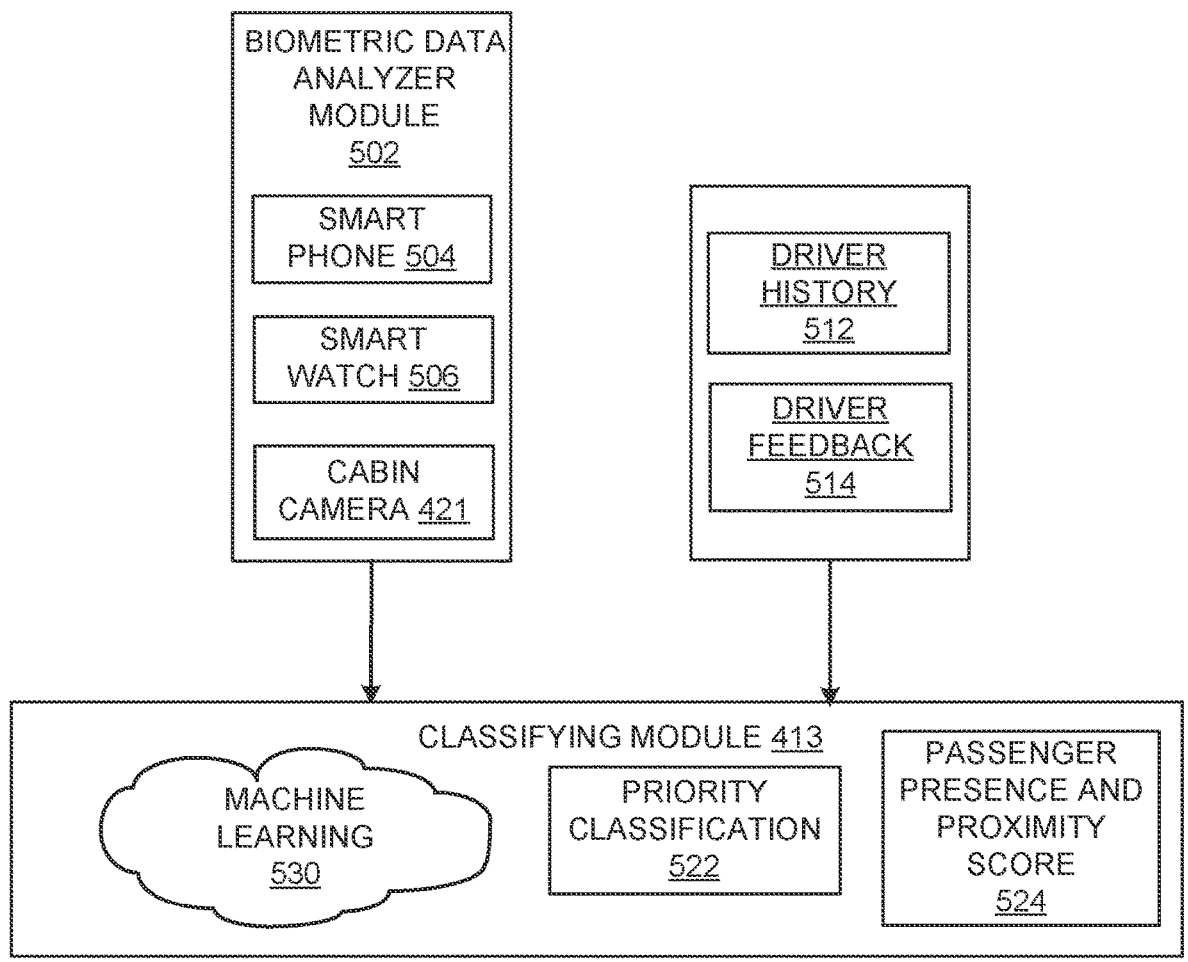
FIG. 5 is a block diagram showing the components of a communication classification and a control process for a vehicle with automated driver assistance according to at least one embodiment.

Referring to FIG. 5, a diagram showing examples of components or modules of a custom process and hardware components according to at least one embodiment. According to one embodiment, the process may include classifying module 413 which utilizes supervised machine learning 530 to determine priority of an incoming communication and also the suitability of routing a call to a passenger based on two calculations: classification of a communication into high, medium or low priority categories 522 and determination of the presence of a passenger as well as a proximity score 524. The biometric analyzer module 502 may also monitor biometric data of the user as described above with respect to assessing the driver state. The biometric analyzer module 502 may utilize a cabin camera 421 to take images of the user for use in the analysis of driver state. For instance, the driver may indicate agitation after the call based on certain gestures and expressions. The biometric analyzer module may utilize a smart phone 504 and/or smart watch 506 to retrieve the user's biometric data 506. For instance, the user may indicate interest in an item based on an elevation in heart rate or breathing. The classifying module 413 may also utilize driver history 512 or driver feedback 514 entered manually. For instance, the driver may have indicated that a certain contact should always be considered high priority or that another contact may not be routed to passengers. Classification 522 and the passenger presence and relationship proximity factors 524 use the above information to determine whether a communication should be classified a certain way and to train the machine learning model 530.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing communication prioritization in a vehicle, the method comprising:
    detecting that the vehicle is operated by a human driver;
    receiving a communication at a device associated with the human driver, wherein the device is within the vehicle;
    determining that the communication has a high priority;
    alerting the human driver to the communication and receiving an indication from the human driver to route the communication to a passenger in the vehicle;
    identifying the passenger in the vehicle;
    determining a relationship proximity score for the passenger with respect to the human driver; and
    routing the communication to the passenger based on the relationship proximity score for the passenger with respect to the human driver; wherein, upon determining that the communication cannot be routed to the passenger in the vehicle,
    modifying the vehicle operation such that the vehicle is operated autonomously;
    routing the communication to the device associated with the human driver; and in response to determining that a driver state is compatible with operating the vehicle at the end of the communication, modifying the vehicle operation such that the vehicle is operated by the human driver.

2. The method of claim 1, wherein the determining that the communication has the high priority uses a machine learning model that predicts whether the human driver wishes to answer the communication.

3. The method of claim 1, wherein the driver state is determined by:
    capturing one or more images of the human driver with a cabin camera; and
    analyzing one or more of a facial expression or a body movement of the human driver in the one or more images of the human driver.

4. The method of claim 1, wherein the driver state is determined by:
    capturing biometric data from the human driver using a device attached to the human driver; and
    analyzing the captured biometric data.

5. A computer program product for managing communication prioritization in a vehicle, the computer program product comprising: a computer-readable storage medium storing computer-readable program code embodied therewith, the computer-readable program code comprising program code executable by a computer to perform a method comprising:
    detecting that the vehicle is operated by a human driver;
    receiving a communication at a device associated with the human driver, wherein the device is within the vehicle;
    determining that the communication has a high priority;
    alerting the human driver to the communication and receiving an indication from the human driver to route the communication to a passenger in the vehicle;
    identifying the passenger in the vehicle;
    determining a relationship proximity score for the passenger with respect to the human driver; and
    routing the communication to the passenger based on the relationship proximity score for the passenger with respect to the human driver; wherein, upon determining that the communication cannot be routed to the passenger in the vehicle,
    modifying the vehicle operation such that the vehicle is operated autonomously;
    routing the communication to the device associated with the human driver; and in response to determining that a driver state is compatible with operating the vehicle at the end of the communication, modifying the vehicle operation such that the vehicle is operated by the human driver.

6. The computer program product of claim 5, wherein the determining that the communication has the high priority uses a machine learning model that predicts whether the human driver wishes to answer the communication.

7. The computer program product of claim 5, wherein the driver state is determined by:
    capturing one or more images of the human driver with a cabin camera; and
    analyzing one or more of a facial expression or a body movement of the human driver in the one or more images of the human driver.

8. The computer program product of claim 5, wherein the driver state is determined by:
    capturing biometric data from the human driver using a device attached to the human driver; and
    analyzing the captured biometric data.

9. A computer system for managing communication prioritization in a vehicle, the computer system comprising: one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is configured to:
    detect that the vehicle is operated by a human driver;
    receive a communication at a device associated with the human driver, wherein the device is within the vehicle;
    determine that the communication has a high priority;

alert the human driver to the communication and receive an indication from the human driver to route the communication to a passenger in the vehicle;

identify the passenger in the vehicle;

determine a relationship proximity score for the passenger with respect to the human driver; and route the communication to the passenger based on the relationship proximity score for the passenger with respect to the human driver; wherein, when determined that the communication cannot be routed to the passenger in the vehicle, modify the vehicle operation such that the vehicle is operated autonomously;

route the communication to the device associated with the human driver; and in response to determining that a driver state is compatible with operating the vehicle at the end of the communication, modify the vehicle operation such that the vehicle is operated by the human driver.

10. The computer system of claim 9, wherein the determining that the communication has the high priority uses a machine learning model that predicts whether the human driver wishes to answer the communication.

11. The computer system of claim 9, wherein the driver state is determined by:

capturing one or more images of the human driver with a cabin camera; and analyzing one or more of a facial expression or a body movement of the human driver in the one or more images of the user captured at a first time human driver.

12. The computer system of claim 9, wherein the driver state is determined by:

capturing biometric data from the human driver using a device attached to the human driver; and analyzing the captured biometric data.

* * * * *